POWER STRAP TENSIONING TOOL

Original Filed June 2, 1958 3 Sheets-Sheet 1

INVENTORS.
John H. Leslie
Harrison C. Lingle
By
Wupper, Gradolph & Love
Attys

POWER STRAP TENSIONING TOOL

Original Filed June 2, 1958 3 Sheets-Sheet 2

INVENTORS.
John H. Leslie
Harrison C. Lingle
By
Wupper, Gradolph & Love
Attys

POWER STRAP TENSIONING TOOL
Original Filed June 2, 1958 3 Sheets-Sheet 3
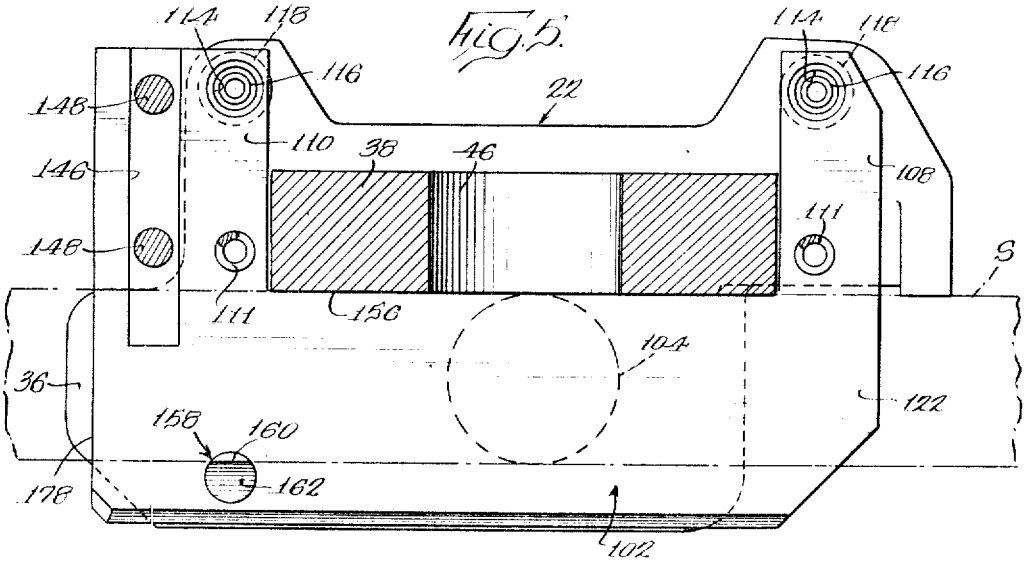
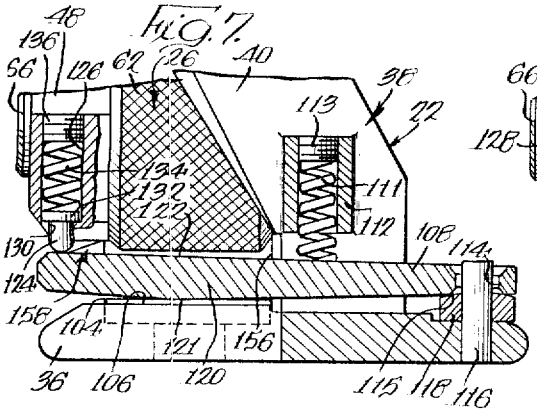
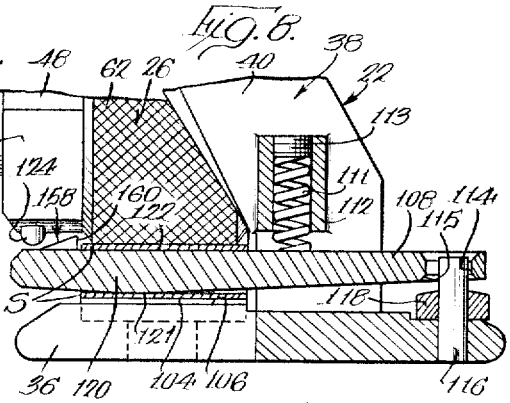
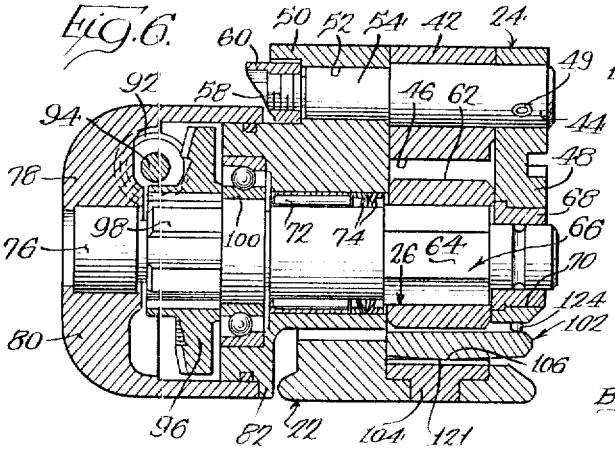
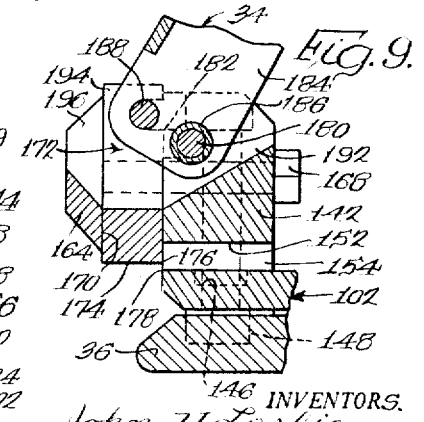
INVENTORS.
John H. Leslie
Harrison C. Lingle
By
Wupper, Gradolph & Love
Attys.

United States Patent Office

Re. 26,114
Reissued Nov. 22, 1966

26,114
POWER STRAP TENSIONING TOOL

John H. Leslie, Winnetka, and Harrison C. Lingle, Wilmette, Ill., assignors to Signode Corporation, a corporation of Delaware Original No. 3,028,885, dated Apr. 10, 1962, Ser. No. 739,115, June 2, 1958. Application for reissue Oct. 21, 1963, Ser. No. 317,860
26 Claims. (Cl. 140—123.6)

Matter enclosed in heavy brackets [ ] appears in the original patent but forms no part of this reissue specification; matter printed in italics indicates the additions made by reissue.

The present invention relates to tools for applying tension to metal strapping passed about a package, bundle, coil, load, or the like, and in particular to a power tool for such purposes which possesses unique features not heretofore known, and advantages over the tools which are commercially available.

The tool of the present invention is particularly useful for applying tension to heavy duty strapping, that is, strapping having a width of one and one-fourth inches or greater, and a thickness between .031 inch and .050 inch, and sometimes .065 inch. Tools of this type have heretofore usually been manually operated, and were frequently of the windlass type wherein one end of the strapping is wound on a spool which is rotated in the strap tensioning and winding direction by reciprocation of a handle. In such tools an appreciable amount of strapping is wound on the spool and must be discarded after the bundle has been banded. Furthermore, such tools require the use of cut to length strapping, and it is obvious that there is wastage in estimating the length of strapping needed for each operation. There was, therefore, wastage of relatively expensive heavy duty strapping in that coiled on the spool or windlass and in the excess needed to make certain that the bundle was encircled before the tensioning operation was begun.

It is, therefore, a principal object of the present invention to provide a new and improved heavy duty power strap tensioning tool which overcomes the objections to the prior art tools.

Another object is to provide a new and improved heavy duty power strap tensioning tool which is particularly useful for repeated strapping operations of tying, banding, or load anchoring at a single station where there is a power source and where the strapping may be drawn from a coil of strapping.

Another object is to provide a new and improved heavy duty strap tensioning tool wherein the strap wastage is kept to an absolute minimum, and wherein it is not necessary to use the strap in presized lengths, or strap cut according to estimates of use.

Another object is to provide a new and improved power strapping tool which is adapted for applying tension to heavy duty, difficult to handle, strapping, for example, that which is one and one-quarter inches wide or wider, and of a thickness lying between .031 and .065 inch.

Another object is to provide a new and improved heavy duty power strap tensioning tool wherein the overlapped strap ends are separated one from the other, so that the moving end slides on a smooth surface and not over the stationary strapping end.

Another object is to provide a new and improved heavy duty power strap tensioning tool wherein the overlapped strapping portions are positioned at opposite faces of a separator plate, with one strap end anchored between the plate and the tool frame and the other passing beneath a tensioning wheel and over the smooth surface of the plate.

Another object is to provide a new and improved heavy duty power strap tensioning tool wherein the overlapped strapping ends are separated one from the other so that the standing strapping end may be severed by a cutter mounted on the tool without cutting or notching the strapping about the bundle.

Another object is to provide a new and improved heavy duty power strap tensioning tool having a movable separator plate, with one strap end anchored between the plate and the tool frame and the other passing beneath the tensioning wheel and over the plate so that the plate may rock and align itself with the periphery of the wheel during the tensioning of the strapping, thereby nullifying the effects of frame deflection.

Another object is to provide a new and improved heavy duty power strap tensioning tool having a separator plate between the strapping portions in the tool, which also serves as a wear plate, a gripper plate, and a fixed cutter element for the strap cutting mechanism.

Another object is to provide a new and improved heavy duty power strap tensioning tool of the tensioning wheel type, which has better strap gripping characteristics resulting from a mechanism that increases the gripping force with increased strap tension and still does not require the biting into the strapping and subsequent removal of the conventional swinging grippers.

Another object is to provide a new and improved heavy duty power strap tensioning tool having a pair of handles which are so arranged that when they are grasped and the tool lifted, the tool elements are opened for the reception of the strap ends for the tensioning operation.

Other objects and advantages will become apparent from the following description taken in conjunction with the accompanying drawings, wherein FIG. 1 is a side view of the tool, taken from that side at which the strapping is inserted, and showing in phantom lines the extent of swinging or pivotal movement of the tension mechanism frame and the tensioning wheel, the air motor, and the handle mounted on the tension mechanism frame relative to the base or main frame;

FIG. 5 is a horizontal sectional view on an enlarged scale, taken across the top of the separator plate, and along the line 5—5 of FIG. 1, looking in the direction of the arrows;

FIG. 6 is a vertical sectional view, through the tensioning wheel drive and mounting, taken along the irregular line 6—6 of FIG. 1, looking in the direction of the arrows;

FIG. 7 is a fragmentary vertical sectional view, on the scale of FIG. 5, taken along the line 7—7 of FIG. 1, looking in the direction of the arrows, and with a portion of the tension mechanism frame broken into section;

FIG. 8 is a view similar to FIG. 7, showing the position of the separator plate during tensioning of the strapping; and FIG. 9 is a detail view through the cutter, taken along the line 9—9 of FIG. 2, looking in the direction of the arrows.

Figure 1:
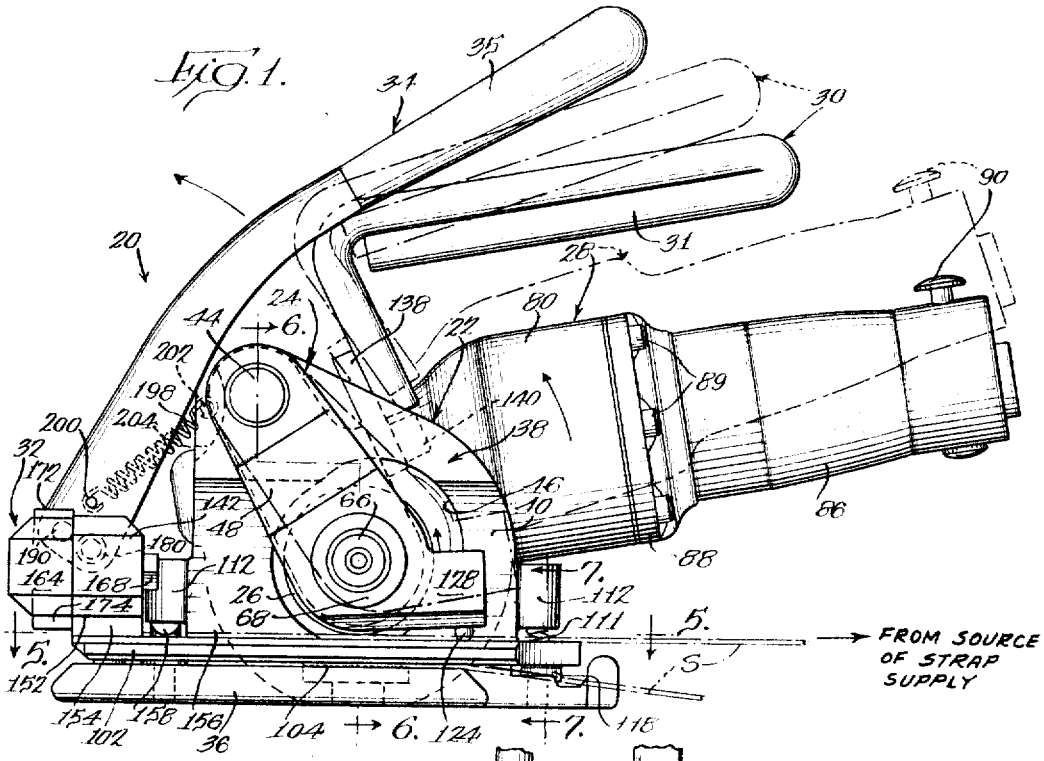

Referring particularly to FIGS. 1 through 4, it will be observed that the tool indicated by the reference character 20 includes a main frame 22 and a tensioning mechanism frame 24 pivotally mounted to the main frame 22 and carrying a strap tensioning wheel 26 and a source of power 28 connected to drive the tensioning wheel 26. A first handle 30 is connected to the tension mechanism frame 24 and is moved to pivot the latter and the tensioning wheel 26 relative to the main frame 22. A strap cutoff mechanism 32 is also provided, which is operated by a handle 34, to sever the strapping S looped about the bundle or load from the source of strap supply after it has been tensioned and has its overlapping ends connected together in a tension resisting joint.

The frame 22 includes a base or foot portion 36 which is adapted to rest on the package, bundle, or load being bound with strapping, and a housing portion 38 upstanding from the base portion adjacent the rear thereof and extending diagonally sidewardly at 40 to an upper boss 42 for pivot shaft 44. The housing 38 has an enlarged opening 46 therein to accommodate the tensioning wheel 26 and a portion of the tension mechanism frame 24 for movement relative to the main frame 22, and particularly toward and away from the foot portion 36 thereof.

The tension mechanism frame 24 includes an outer arm 48 which is pinned at 49 on the outer end of the shaft 44 and an inner arm or gear case head 50 located on the other side of the frame housing 38. The gear case head 50 is bored at 52 to receive smaller diameter end 54 of the shaft 44 so that the inner face of the gear case head 50 seats against a shoulder 56 on the shaft properly to position the two portions 48 and 50 of the tensioning mechanism frame 24 (FIG. 6). The shaft 44 has a threaded outer extension 58 and a nut 60 is screwed thereon to hold the gear case head 50 on the shaft and prevent movement between the shaft 44 and the gear case head 50.

The tensioning wheel 26 is provided with a serrated or knurled peripheral surface 62 so as to enable the wheel more effectively to engage the strapping S which is passed therebeneath. The wheel 26 is nonrotatably mounted on a hexagonally shaped section 64 of a tensioning wheel shaft 66.

The outer end of the tensioning wheel shaft 66 is journaled in a bushing 68 which has a press fit in a suitable aperture 70 in the tensioning wheel mechanism frame arm 48. At its other end the shaft 66 is journaled in a needle bearing 72 in the gear case head 50 and a pair of oil seals 74 prevent the leakage of oil from the bearing 72 toward the tensioning wheel 26. The shaft 66 is also journaled in a needle bearing 76 fixed on a boss 78 in gear housing 80 forming a part of the power source assembly 28. The gear case head 50 is formed with an outstanding flange 82 against which the gear housing 80 abuts and is sealed, and suitable bolts 84 (FIG. 4) secure the gear housing 80 to the gear case head 50 and thus mount the power source assembly 28 on the tensioning mechanism frame 24.

Power is supplied to the shaft 66, and thus to the tensioning wheel 26, from an air motor 86 controlled by an air valve (not shown) opened and closed by a button 90. The motor 86 is mounted to the gear housing 80 by means of a clamping ring 88 and bolts 89 and drives a gear train in a well known manner. The gear train includes a worm 92 mounted or formed on a shaft 94 which extends through the gear housing 80 (FIG. 6). The worm 92 is meshed with a spiroid gear 96 which is nonrotatably mounted on a splined section 98 of the shaft 66, and the latter is further journaled and held against longitudinal movement in the gear housing 80 and gear case head 50 by a thrust bearing 100. The worm shaft 94 is journaled in bearings (not shown) in the gear housing 80 at opposite sides of the worm 92. When the operator moves the control button 90 for the air motor 86 to the "on" or driving position, the tensioning wheel 26 is driven in the counterclockwise or strap tensioning direction (FIG. 1).

The strapping S, which is indicated in phantom lines, has one end anchored between the foot portion 36 of the main frame and a separator plate 102 which overlies the foot portion 36. The strapping extends rearwardly from the tool, or toward the right, as seen best in FIG. 1, and around the bundle. The anchored end of the strapping projects forwardly of the tool from between the foot 36 and the separator plate 102 a distance sufficient to enable a strap end uniting joint to be formed between overlapping strapping portions and an embracing seal blank immediately to the front of the tool at the conclusion of the strap tensioning operation.

After the strapping has been passed about the bundle it is inserted between the strap tensioning wheel 26 and the upper surface of the separtor plate 102. To assist in anchoring the strapping end between the separator plate 102 and the foot 36, there is inserted into the foot portion an anchoring plate or plug 104 having a serrated or knurled upper surface 106 which may embed itself slightly in the under surface of the anchored strapping end.

Figure 3:
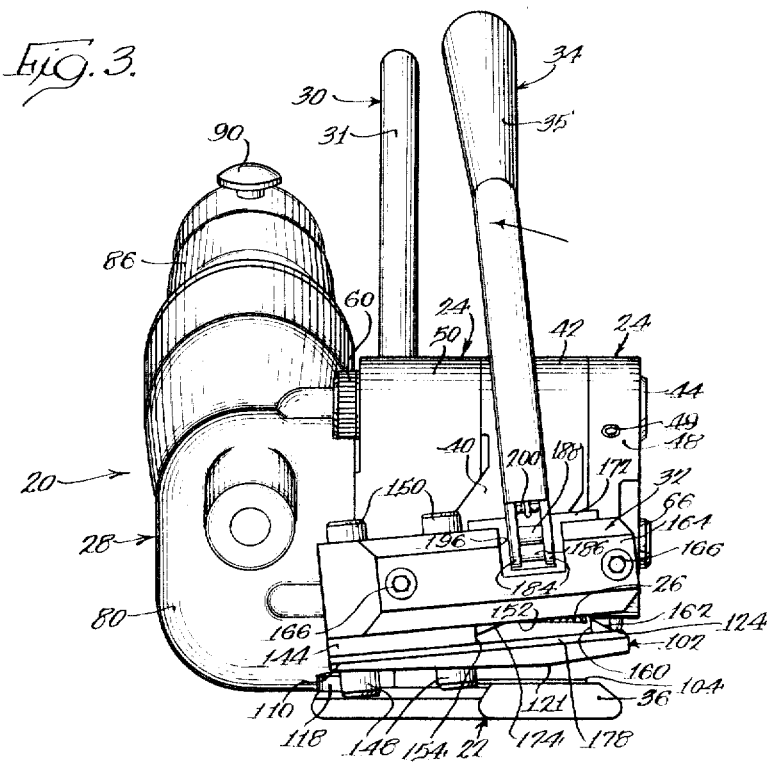
FIG. 3 is a front elevational view, similar to FIG. 2, but showing the wear, separator, or floating plate tilted and the feed wheel raised for the insertion of strapping.
Figure 4:
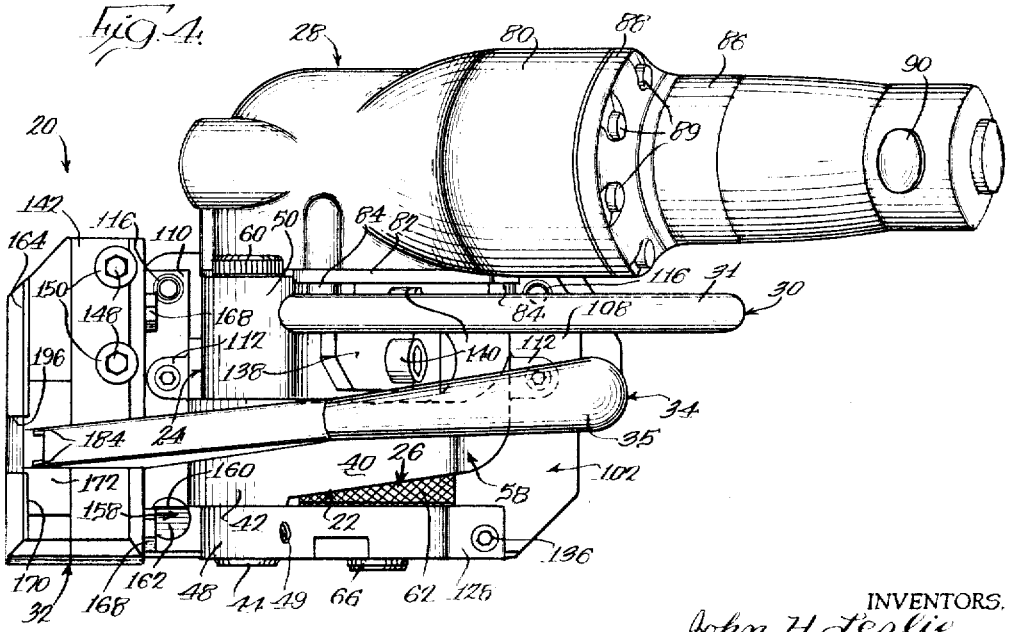
FIG. 4 is a top plan view showing the tool elements in the positions shown in FIG. 3.

The separator plate 102 is not fixed to either the main frame 22 or to the tensioning mechanism frame 24, but it overlies the foot portion 36 of the main frame and has relative motion with respect thereto, or otherwise described, it floats with respect to the main frame 22. The separator plate 102 has a pair of extensions 108 and 110 (FIG. 5) which project along the sides of the upstanding frame housing 38 and are relatively closely fitted thereto, but not sufficiently closely as to prevent rocking or tilting of the plate 102 (FIGS. 3, 7, and 8).

At their outer ends, the extension 108 and 110 are formed with apertures 114 (FIG. 7) through which extend guide pins or posts 116 which have their lower ends fixed in the base portion 36 of the main frame and project appreciably thereabove. Between the undersides of the extensions 108 and 110 and the upper face of the base 36 are crown pivot blocks 118 which are press fitted over the posts 116 and on which the separator plate 102 may pivot. The extensions 108 and 110 are chamfered at 115 at their undersides around the openings 114 to facilitate the pivoting or rocking movement of the plate 102.

The separator plate 102 is biased in the counterclockwise direction (FIGS. 7 and 8) by a pair of springs 111 which are confined in hollow bosses 112 carried by the frame housing 38 and extending over the extensions 108 and 110. The lower ends of the springs 111 bear on the upper surfaces of the extensions 108 and 110 and their upper ends are retained by screws 113 threaded into the tapped upper ends of the hollow bosses 112. The force exerted by the springs 111 can be adjusted and equalized by the screws 113. As seen in FIG. 7, the springs 111 normally hold the separator plate 102 against the pivot blocks 118 and the fixed strap anchor 104 in the foot 36. After the plate 102 has been raised, and rotated in the clockwise direction (FIG. 7) on the pivot blocks 118 and the strap end inserted, the springs 111 provide the initial gripping force that the plate 102 exerts against the stationary end of the strapping.

As shown in FIGS. 2, 3, 7, and 8, the separator plate 102 has a doubly beveled underside, being thickest at 120 under the axial center of the tensioning wheel 26 and tapering away from therefrom toward both longitudinal edges. This configuration defines a pivot area 121 extending the length of the separator plate 102 for the latter to rock on during the tensioning of the strapping.

As seen most clearly in FIG. 7, with no strapping in the tool the flat upper surface 122 of the separator plate is not parallel with the rotational axis and the relatively wide cylindrical surface of the tensioning wheel 26 and the wheel is slightly closer to the plate 102 at their outer edges. When strapping is inserted into the tool one end is anchored between the anchoring plug 104 and the underside of the plate 102 under the pressure exerted by the springs 111. The other end lies between the tensioning wheel 26 and the chromium plated surface 122 with the tensioning wheel contacting the strapping only adjacent its outer edge. The weight of the tension mechanism frame 24, the tensioning wheel 26, and the drive 28 for the tensioning wheel holds the latter against the strapping.

During the strap tensioning operation with the tensioning wheel 26 driving in the counterclockwise direction (FIG. 1), it tends to travel on the strapping and in doing so it pulls the tension mechanism frame 24 in the clockwise direction about its pivot 44. This increases the pressure on the upper strapping portion, on the separator plate 102 and consequently on the fixed strapping end. As the pressure of the tensioning wheel increases it rocks the separator plate 102 on its longitudinal pivot 121, lifting the extensions 108 and 110 away from the pivot blocks 118 (FIG. 8) against the force of the springs 111. This rocking movement increases the area of contact between the tensioning wheel 26 and the strapping and has no adverse effect on the gripping of the fixed strapping end between the plate 102 and the fixed anchor 104. Should the pressure exerted by the tensioning wheel 26 become great enough to deflect the foot 36 of the frame, the effect of this deflection would be nullified by the rocking movement of the separator plate 102 on the foot 36 and alignment would be maintained between the tensioning wheel 26 and the upper surface 122 of the plate 102.

The foregoing described construction provides a more efficient gripping of the strapping, a more effective drive between the tensioning wheel 26 and the strapping, and a longer tool life since the movable separator plate 102 can compensate for wear in the tool parts.

Figure 2:
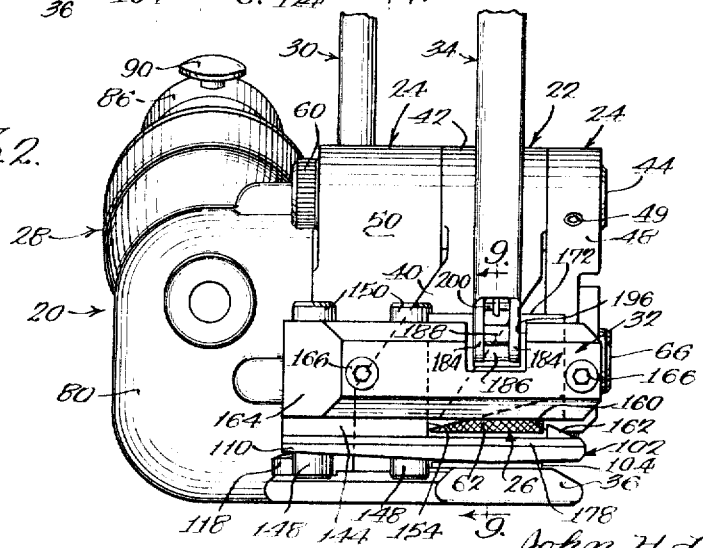
FIG. 2 is a front elevational view, looking at the left end of the tool as seen in FIG. 1.

As will be described in greater detail presently, the strap cutter mechanism 32 is mounted on the left end of the separator plate 102, and therefore the handle 34 is affixed to this plate. By rocking the handle 34 toward the rear of the tool or to the left, as seen in FIGS. 2 and 3, the separator plate 102 is rocked on the crowned pivots 118 and lifted away from the foot portion 36 to permit the insertion of the strap end between the plate 102 and the foot 36. This rocking movement compresses the springs 111 and is limited by the contact between the extensions 108 and 110 and the bosses 112.

The L-shaped handle 30 for the tension mechanism has its inner end welded to a bracket 138 which is secured by bolts 140 to the gear case head 50. By moving the handle 30 to the dotted line position of FIG. 1, the tensioning wheel 26 is lifted away from the surface 122 of the separator plate 102 to enable strapping to be inserted therebetween. The handles 30 and 34 have generally parallel, relatively close, gripping portions 31 and 35, respectively, and when both of these are grasped together and the tool is lifted, it is opened to receive strapping between the separator plate 102 and the frame foot 36 and between the separator plate 102 and the tensioning wheel 26.

The cylindrical surface 62 of the tensioning wheel 26 is hardened and serrated or knurled, and the separator plate 102 immediately therebeneath has a smooth chrome plated surface 122 which might become appreciably damaged were the wheel 26 permitted to come into contact with it at the end of each tensioning operation. This contact is prevented by a stop pin 124 (FIG. 7) which is carried in a bore 126 of a boss 128 formed on the lower end of the link or arm 48. The stop pin 124 bears against the surface 122 of the separator plate 102 by projecting through a counterbore 130 with its outward movement limited by a head or shoulder 132 on the pin. The pin is projected outwardly by a spring 134 and the tension of the spring is regulated by a plug 136 screwed into the tapped outer end of the bore 126. The force exerted by the spring 134 is sufficient to support the weight of the air motor 86, the gear housing 80, the tensioning mechanism frame 24, and all of the mechanism associated therewith, thus to hold the tensioning wheel 26 away from the surface 122 of the separator plate 102. The space normally permitted between the serrated or knurled periphery of the wheel 26 and the plate 102 is less than the thickness of the strapping S with which this tool is primarily adapted to be used, and thus when a piece of strapping is inserted between the plate and the wheel, the stop pin 124 ordinarily will be held away from the surface 122 (FIG. 8). However, should the strapping be slightly thinner, movement toward the plate is permitted.

The strap cutter mechanism 32 includes a cutter block 142 which has a foot portion 144 seated in a recess 146 (FIG. 5) in the extension 110 of the separator plate 102, the recess being disposed perpendicular or normal to the movement path of the strapping S. The cutter block 142 is secured to the separator plate 102 by a pair of machine bolts 148 which extend into tapped openings in the cutter block and are presented from unintentional removal by Allen lock nuts 150. The underside of the cutter block 142 is recessed upwardly at 152 above the surface of the separator plate 102 to accommodate the strapping S for passage therebeneath. The inner face of the foot portion 144 therefore defines a guide surface 154 against which the strap is guided and is parallel to and in the same plane with the inner faces 156 of the upwardly extending frame housing 38.

To prevent the strapping S from moving outwardly of the tool during the tensioning operation, a strap guide 158 in the form of a plug is carried by the separator plate 102 and projects above the surface 122 thereof. The strap guide 158 is positioned outwardly of the guide faces 154 and 156 a distance slightly greater than the width of the strapping with which this tool is to be used which may, for example, be one and one-quarter inches. The outer strap guide 158 has a vertical guide face 160 faced inwardly toward the surfaces 154 and 156, and a beveled outer surface 162 to facilitate insertion of the strapping between the plate surface 122 and the tensioning wheel 26.

The strap cutter mechanism 32 also includes a cutter retainer 164 which is secured to the outer face of the cutter block 142 by a pair of bolts 166 projecting into and screwed through suitable tapped openings in the cutter block 142 and prevented from accidental removal by lock nuts 168. It should be noted from FIGS. 2, 3, and 9 that the lower edge of the cutter retainer does not project below the recessed opening 152 of the cutter block, thereby providing a clear passage for the strapping.

The cutter retainer 164 is formed on its face toward the cutter block 142 with a rectangular recess 170 in which is slidable a cutter 172 having a diagonal lower face 174 to a define a diagonal cutting edge 176 which coacts with a cutting edge 178 formed on the left end of the separator plate 102.

The cutter is operated by the handle 34 which has its lower end pivoted on a pin 180, the ends of which are carried in a pair of slots 182 in the cutter block 142 at either side of the handle 34. The lower end of the handle 34 is bifurcated to provide a pair of side plates 184 and between them the pin 180 is fitted with a sleeve 186 which properly locates the pin with respect to the handle 34 and to the slots 182. The slots 182 extend to the face of the cutter block across which the cutter 172 slides. The cutter is pivotally connected to the handle 34 by a pin 188 which has its ends carried in slots 190 in the cutter at either side of the handle 34. The slots 190 extend to the face of the cutter which slides across the meeting face of the cutter block. However, the pins 188 and 180 do not slide into each other's slots, because the slots cross each other during handle movement at a time when the pins are moved apart their greatest distance by virtue of the fact that they are fixed relative to the handle and rotate and slide in the block 142 and cutter 172, respectively. In order to accommodate the lower end of the handle and its pivotal movement, the cutter block 142, cutter 172, and cutter retainer 164, are slotted respectively at 192, 194, and 196.

The handle 34 is biased toward the position shown in FIG. 1 by a handle spring 198, one end of which is connected to a pin 200 extending between the spaced plates 184 of the handle, and a second pin 202 carried in a recess 204 in the upstanding housing 38 of the main frame (FIG. 1).

When it is desired to sever the strapping looped about the bundle after the joint has been formed therein, the cutter handle 34 is rotated in the counterclockwise direction (FIG. 1) to move the cutter 172 past the end of the separator plate 102 so that the strapping is severed between the cuttings edges 176 and 178. This frees the strapped bundle from the coil of strapping and the tool may be removed from the strapping tied about the bundle by rocking the cutter handle 34 toward the handle 30 (FIG. 3), thereby releasing the strapping about the bundle from the clamping action of the separator plate 102.

While the operation of the tool can be understood from the foregoing description of its construction, a brief resume of its use and operation is here inserted for purposes of clarity.

Assuming that the tool is empty and no strapping lies between the separator plate 102 and the foot 36 of the main frame or the tensioning wheel 26 and the upper surface 122 of the plate, the tool is picked up or grasped by both handles 30 and 34. Movement of the handle 30 rocks the tensioning mechanism about the pivot pin 44 to raise the tensioning wheel 26 away from the foot 36 of the frame and away from the separator plate 102. Movement of the handle 34 toward the handle 30 causes the separator plate 102 to be pivoted on the pivot blocks 118 and against the pressure exerted by the springs 111.

The free end of the strapping is placed about the separator plate 102 and the foot 36 of the frame with an adequate length projecting from the front or left end of the tool (FIGS. 1 and 4), to provide a portion for forming the joint. The handle 34 is released and the end of the strapping is anchored between the separator plate 102 and the foot portion of the tool by the biasing effect of springs 111. The strapping is looped about the bundle or package and the other end of standing portion thereof overlapped with the projecting end of the strapping and then inserted between the raised tensioning wheel 26 and the top surface 122 of the separator plate. After the strapping has been passed about the bundle and inserted under the tensioning wheel 26, the handle 30 is released and the weight of the tensioning mechanism, the air motor, and the gear housing attached to it will restore the parts to the full line position shown in FIG. 1 and cause the strapping to be gripped between the tensioning wheel 26 and the surface of the separtor plate 102.

The two ends of the strapping are disposed at opposite faces of the separator plate. The first end is immovably anchored between the anchor or gripper 104 and the beveled underside of the separator plate 102, while the standing portion of the strapping which is connected to the coil of strapping is positioned between the upper face 122 of the separator plate and the periphery of the tensioning wheel 26.

The valve controlling button 90 on the air motor 86 is moved to the "on" position and air from a suitable pressure source (not shown) drives the air motor and associated gearing in conventional fashion. This gearing has a high reduction and is connected to the drive shaft 66 for the tensioning wheel 26 and the latter is rotated in the counterclockwise direction (FIG. 1) so as to draw the strapping tightly about the bundle and to apply tension thereto. As the resistance to strap tensioning increases, the tensioning wheel 26 slows and tends to rotate along the strapping toward the bundle. This gives the tensioning mechanism frame 24 a clockwise force component which increases the pressure exerted by the tensioning wheel 26 against the strapping, which in turn increases the pressure exerted by the separator plate 102 against the strapping clamped between it and the foot 36 of the tool. During this increase in pressure the separator plate 102 will rock to the position shown in FIG. 8 to align itself with the tensioning wheel 26.

When the strapping has been fully tensioned, the tensioning wheel 26 stalls. While the tool holds the tension in the strapping about the bundle, a joint is formed between the overlapped strapping portions at the front of the tool (FIGS. 1 and 4), by a separate joint forming tool, which may be of the type disclosed in Harrison C. Lingle Patent No. 2,831,381, dated April 22, 1958. After the joint has been formed in the overlapping strapping portions and an embracing seal blank, the lever 34 is pivoted in the counterclockwise direction (FIG. 1) to sever the strapping tied about the bundle from that extending beneath the tensioning mechanism wheel 26 and leading back to the source of strap supply. It will be observed that the cutter blade 172, even though depressed to its fullest extent, will not sever the lower portion of the strapping because there is no surface or edge against which the cutter may coact with respect to the lower strapping portion. The handle 34 is rocked toward the handle 30 and the separator plate 102 releases the strapping about the bundle which is thereby disengaged from the tool.

The strapping may be cut to length strapping, but preferably, since this tool has the cutter assembly incorporated in it, wastage of strapping is avoided by drawing it from a strapping coil which may be mounted on a suitable reel, such for example, as that shown in the copending application of Harrison C. Lingle, Serial No. 718,637, filed March 3, 1958, now abandoned, entitled "Steel Strapping Dispenser" and assigned to the assignee of this invention.

It will be seen from the foregoing description that the objectives claimed for this invention at the outset of the specification are fully attained by the structure illustrated and described.

While a preferred embodiment of the power strap tensioning tool of this invention has been shown and described, it will be apparent that numerous modifications and changes may be made therein without departing from the underlying principles of the invention. It is, therefore, intended by the following claims to include within the scope of the invention all such variations and modifications by which substantially the results of this invention may be obtained through the use of the same of equivalent means.

What is claimed as new and desired to be secured by Letters Patent of the United States is:

1. A tool for applying tension to strapping about a bundle comprising in combination, a tool frame including means forming a fixed anchoring member, a rotatable tensioning wheel, means mounting said tensioning wheel on said frame for bodily movement toward and away from said fixed anchoring member, and a separator plate interposed between said anchoring member and said tensioning wheel, said separator plate being mounted for limited floating movement between said anchoring member and said tensioning wheel and for rocking movement along a line parallel to the direction of strap extension, whereby one end of the strapping is anchored against movement between said anchoring member and said separator plate by the force exerted by said tensioning wheel toward said anchoring member and on said plate and the other and standing portion is drawn between said tensioning wheel and said plate during the tensioning operation.

2. A power tool for applying tension to strapping about a bundle comprising in combination, a tool frame including means forming a fixed anchoring member, a rotatable tensioning wheel, power means connected to said wheel for driving the latter in strap tension direction, means mounting said tensioning wheel on said frame for bodily movement toward and away from said fixed anchoring member, and a separator plate interposed between said anchoring member and said tensioning wheel, said separator plate being mounted for limited floating movement between said anchoring member and said tensioning wheel and for rocking movement along a line parallel to the direction of strap extension, whereby one end of the strapping is anchored against movement between said anchoring member and said separator plate by the force exerted by said tensioning wheel toward said anchoring member and on said plate and the other and standing portion is drawn between said tensioning wheel and said separator plate during the tensioning operation.

3. A power tool for applying tension to strapping about a bundle comprising in combination, a tool frame including means forming a fixed anchoring member, a rotatable tensioning wheel, power means connected to said wheel for driving the latter in strap tensioning direction, means mounting said tensioning wheel on said frame for bodily movement toward and away from said fixed anchoring member, a separator plate interposed between said anchoring member and said tensioning wheel, said separator plate being mounted for limited floating movement between said anchoring member and said tensioning wheel and for rocking movement along a line parallel to the direction of strap extension, whereby one end of the strapping is anchored against movement between said anchoring member and said separator plate by the force exerted by the tensioning wheel toward said anchoring member and on said plate and the other and standing portion is drawn between said tensioning wheel and said separator plate during the tensioning operation, and a cutter mechanism carried by said separator plate and operable to sever the standing portion of the strapping.

4. A power tool for applying tension to strapping about a bundle comprising in combination, a tool frame including means forming a fixed anchoring member, a power driven rotatable tensioning wheel, means mounting said tensioning wheel on said frame for bodily movement toward and away from said fixed anchoring member, handle means connected to said tensioning wheel for moving the latter away from said anchoring member, a separator plate interposed between said anchoring member and said tensioning wheel, said separator plate being mounted for limited floating movement between said anchoring member and said tensioning wheel and for rocking movement along a line parallel to the direction of strap extension, and second handle means connected to said separator plate for moving the latter away from said anchoring member, so that both said handles may be grasped to condition the tool for the insertion of one end of the strapping between said anchoring member and said separator plate and for insertion of the other end of the strapping between said separator plate and said tensioning wheel, whereby the first end of the strapping is anchored against movement between said anchoring member and said separator plate by the force exerted by said tensioning wheel toward said anchoring member and on said plate and the other end may be drawn under said tensioning wheel and across said separator plate during the tensioning operation.

5. A power tool for applying tension to strapping about a bundle comprising in combination, a tool frame including means forming a fixed anchoring member, a rotatable tensioning wheel, means connected to and driving said wheel in strap tensioning direction, means mounting said tensioning wheel on said frame for bodily movement toward and away from said fixed anchoring member, and a separator plate interposed between said anchoring member and said tensioning wheel and having a smooth upper surface over which strapping may be slid, said separator plate being mounted for limited floating movement between said anchoring member and said tensioning wheel and for rocking movement along a line parallel to the direction of strap extension, whereby one end of the strapping is anchored against movement between said anchoring member and said separator plate by the force exerted by said tensioning wheel toward said anchoring member and on said plate and the other and standing portion is drawn by said tensioning wheel under said tensioning wheel and across said surface of said separator plate during the tensioning operation.

6. A power tool for applying tension to strapping about a bundle comprising in combination, a tool frame including means forming a fixed anchoring member, a power driven rotatable tensioning wheel, means mounting said tensioning wheel on said frame for bodily movement toward and away from said fixed anchoring member, a separator plate interposed between said anchoring member and said tensioning wheel and having a smooth upper surface over which strapping may be slid by said tensioning wheel, said separator plate being mounted for limited floating movement between said anchoring member and said tensioning wheel and for rocking movement along a line parallel to the direction of strap extension, and spring pressed plunger means interposed between said tensioning wheel mounting means and said separator plate biasing said tensioning wheel slightly away from said surface to prevent damage to the latter by said wheel, whereby one end of the strapping is anchored against movement between said anchoring member and said separator plate by the force exerted by said tensioning wheel toward said anchoring member and on said plate and the other and standing portion is drawn by said tensioning wheel under said tensioning wheel and across said surface of said separator plate during the tensioning operation.

7. A power tool for applying tension to steel strapping about a bundle comprising in combination, a main frame having an anchor member over which one end of the strapping extends and against which it is anchored, a tension mechanism frame carrying a power driven rotatable tensioning wheel pivotally mounted on said main frame for movement of said tensioning wheel toward and away from said anchor member, a first handle secured to said tensioning mechanism frame for manual pivoting of said frame and said wheel relative to said main frame, a separator plate overlying said anchor member and positioned below said tensioning wheel, means mounting said separator plate on said main frame for limited floating movement between said anchor member and said tensioning wheel and for rocking movement along a line parallel to the direction of strap extension means interposed between said main frame and said separator plate biasing said plate toward said anchor member, the anchored strapping end being held between said anchor member and said separator plate by the force exerted by said tensioning wheel toward said anchor member and on said plate and the opposite end of the strapping lying between said plate and said tensioning wheel, and a second handle secured to said separator plate for moving said plate away from said anchor member for the insertion of strapping, said handles having generally parallel portions so that they may be grasped simultaneously to open the tool for the insertion of strapping.

8. A power tool for applying tension to steel strapping about a bundle comprising in combination, a main frame having a foot portion against which one end of the strapping is anchored, a tensioning mechanism frame carrying a rotatable tensioning wheel pivotally mounted on said main frame for movement of said tensioning wheel toward and away from said foot portion, power means connected to drive said tensioning wheel in strap tensioning direction, a handle secured to said tensioning mechanism frame for manual pivoting of said frame and said wheel relative to said main frame, a separator plate overlying said foot portion positioned below said tensioning wheel and mounted on said main frame, said separator plate being mounted for limited floating movement between said foot portion and said tensioning wheel and for rocking movement along a line parallel to the direction of strap extension, the anchored strapping end being held between said foot portion and said separator plate by the force exerted by said tensioning wheel toward said foot portion and on said plate and the opposite end of the strapping lying between said plate and said tensioning wheel, and a handle secured to said separator plate for moving said plate away from said foot portion for the insertion of strapping.

9. A power tool for applying tension to steel strapping about a bundle comprising in combination, a main frame having a foot portion against which one end of the strapping is anchored, a tensioning mechanism frame carrying a rotatable tensioning wheel pivotally mounted on said main frame for movement of said tensioning wheel toward and away from said foot portion, means connected to drive said tensioning wheel in strap tensioning direction, a handle secured to said tensioning mechanism frame for manual pivoting of said frame and said wheel relative to said main frame, a separator plate overlying said foot portion below said tensioning wheel and mounted on said main frame, said separator plate being mounted for limited floating movement between said foot portion and said tensioning wheel and for rocking movement along a line parallel to the direction of strap extension, the anchored strapping end being held between said foot portion and said separator plate by the force exerted by said tensioning wheel toward said foot portion and on said plate and the opposite end of the strapping lying between said plate and said tensioning wheel, a cutter assembly carried by said plate and operable to sever said opposite end of the strapping, and a handle connected to said cutter assembly for operating the latter and for moving said plate away from said foot portion for the insertion of strapping.

10. A power tool for applying tension to steel strapping about a bundle comprising in combination, a main frame having a foot portion over which one end of the strapping extends and against which it is anchored, a tensioning mechanism frame carrying a rotatable tensioning wheel pivotally mounted on said main frame for movement of said tensioning wheel toward and away from said foot portion, power means connected to drive said tensioning wheel in strap tensioning direction, a handle secured to said tensioning mechanism frame for manual pivoting of said frame and said wheel relative to said main frame, a separator plate overlying said foot portion of said main frame and positioned below said tensioning wheel, means mounting said separator plate on said main frame for limited floating movement between said foot portion and said tensioning wheel and for rocking movement along a line parallel to the direction of strap extension means interposed between said main frame and said separator plate biasing said plate against said foot portion, the anchored strapping end being held between said foot portion and said separator plate by the force exerted by said tensioning wheel toward said foot portion and on said plate and the opposite end of the strapping lying between the top surface of said plate and said tensioning wheel, and a handle secured to said separator plate for moving said plate away from said foot portion for the insertion of strapping.

11. A power tool for applying tension to steel strapping about a bundle comprising in combination, a main frame having a foot portion over which one end of the strapping extends and against which it is anchored, a tensioning mechanism frame pivotally mounted on said main frame on an axis substantially above said foot portion, a tensioning wheel journaled on said tensioning mechanism frame in a position such that the pivotal movement of said tensioning mechanism frame moves said tensioning wheel toward and away from said foot portion, an air motor mounted on said tensioning mechanism frame and connected to drive said tensioning wheel in strap tensioning direction, a handle secured to said tensioning mechanism frame for manual pivoting of said frame and said wheel relative to said main frame, a separator plate overlying said foot portion of said main frame and positioned below said tensioning wheel, means mounting said separator plate on said main frame for limited floating movement between said foot portion and said tensioning wheel and for rocking movement along a line parallel to the direction of strap extension, means interposed between said main frame and said separator plate biasing said plate against said foot portion, the anchored strapping end being held between said foot portion and said separator plate by the force exerted by said tensioning wheel toward said foot portion and on said plate and the opposite end of the strapping lying between the top surface of said plate and said tensioning wheel, and a handle secured to said separator plate for moving said plate away from said foot portion for the insertion of strapping.

12. A power tool for applying tension to steel strapping about a bundle comprising in combination, a main frame having a foot portion over which one end of the strapping extends and against which it is anchored, a tensioning mechanism frame pivotally mounted on said main frame on an exis substantially above said foot portion, a tensioning wheel journaled on said tensioning mechanism frame in a position such that the pivotal movement of said tensioning mechanism frame moves said tensioning wheel toward and away from said foot portion, an air motor mounted on said tensioning mechanism frame and connected to drive said tensioning wheel in strap tensioning direction, a handle secured to said tensioning mechanism frame for manual pivoting of said frame and said wheel relative to said main frame, a separator plate overlying said foot portion of said main frame and positioned below said tensioning wheel, means mounting said separator plate on said main frame for limited floating movement between said foot portion and said tensioning wheel and for rocking movement along a line parallel to the direction of strap extension, means interposed between said main frame and said separator plate biasing said plate against said foot portion, the anchored strapping end being held between said foot portion and said separator plate by the force exerted by said tensioning wheel toward said foot portion and on said plate and the opposite end of the strapping lying between the top surface of said plate and said tensioning wheel, a cutter assembly mounted on said plate and operable to sever that strapping portion overlying said plate, and a handle secured to said cutter assembly and movable in one direction to operate said assembly to sever the strapping and movable in another direction to move said plate away from said foot portion for the insertion of strapping.

13. A power tool for applying tension to steel strapping about a bundle comprising in combination, a main frame having a foot portion carrying an anchor member over which one end of the strapping extends and against which it is to be anchored, a tensioning mechanism frame pivotally mounted on said main frame on an axis substantially above said foot portion, a tensioning wheel journaled on said tensioning mechanism frame in a position such that the pivotal movement of said tenisoning mechanism frame moves said tensioning wheel toward and away from said foot portion, an air motor mounted on said tensioning mechanism frame and connected to drive said tensioning wheel in strap tensioning direction, a first handle secured to said tensioning mechanism frame for manual pivoting of said frame and said wheel relative to said main frame, a separator plate overlying said foot portion of said main frame and said anchor member and positioned below said tensioning wheel, means mounting said separator plate on said main frame for limited floating movement between said foot portion and said tensioning wheel and for rocking movement along a line parallel to the direction of strap extension, means interposed between said main frame and said separator plate biasing said plate against said anchor member, the anchored strapping end being held between said anchor member and said separator plate by the force exerted by said tensioning wheel toward said foot portion and said anchor member and on said plate and the opposite end of the strapping lying between said plate and said tensioning wheel, a cutter assembly carried by said plate and operable to sever said opposite end of the strapping, and a second handle connected to said cutter assembly for operating the latter when moved in one direction and for moving said plate away from said foot portion for the insertion of strapping when moved in a second direction and toward said first handle, said handles having generally parallel portions so that they may be grasped simultaneously and squeezed to open the tool for the insertion of strapping.

14. A power tool for applying tension to strapping about a bundle comprising in combination, a tool frame including means forming a fixed anchoring member, a rotatable strap tensioning wheel, power means connected to said wheel for driving the latter in strap tensioning direction, means mounting said tensioning wheel on said frame for bodily movement toward and away from said fixed anchoring member, a movable separator plate interposed between said anchoring member and said tensioning wheel for limited floating movement therebetween, fixed pivot forming means carried by said frame for said separator plate, means on said separator plate coacting with said fixed pivot means so that said separator plate may rock on said pivot means along a line parallel to the direction of strap extension, and means carried by said frame and acting on said separator plate biasing it toward said anchoring member and toward said fixed pivot means, whereby one end of the strapping may be anchored against movement between said anchoring member and said separator plate by the force exerted by said tensioning wheel toward said anchoring member and on said plate and the other and standing portion may be drawn between said tensioning wheel and said plate during the tensioning operation.

15. A power tool for applying tension to strapping about a bundle comprising in combination, a main frame having a foot portion against which one end of the strapping may be anchored, a rotatable tensioning wheel, power means connected to drive said tensioning wheel in strap tensioning direction, means mounting said tensioning wheel for swinging movement toward and away from said foot portion, a movable separator plate overlying said foot portion and positioned below said tensioning wheel for limited, floating movement therebetween, fixed pivot means carried by said main frame underlying said separator plate at one side thereof and on which said plate may rock toward and away from said foot portion along a line parallel to the direction of strap extension, second pivot means formed on the underside of said separator plate and extending longitudinally thereof over said foot portion, and resilient means acting on the upper surface of said separator plate and biasing said plate toward and against said fixed pivot means and said foot portion, whereby one end of the strapping may be anchored between said foot portion and said second pivot means on the underside of said separator plate by the force exerted by said tensioning wheel toward said foot portion and on said plate and the other end of the strapping may be drawn over the upper surface of said separator plate by said tensioning wheel during the tensioning operation, and whereby pressure of the tensioning wheel on said other end of the strapping will cause rocking of said separator plate to align the upper surface of said separator plate, said other end of the strapping, and said tensioning wheel.

16. A power tool for applying tension to strapping about a bundle comprising in combination, a main frame having a foot portion against which one end of the strapping may be anchored, a tensioning mechanism frame carrying a rotatable tensioning wheel pivotally mounted on said main frame for swinging movement of said tensioning wheel toward and away from said foot portion, power means connected to drive said tensioning wheel in strap tensioning direction, a movable separator plate overlying said foot portion and positioned below said tensioning wheel for limited floating movement therebetween, a pair of fixed pivot members carried by said main frame and underlying said separator plate at one side thereof, first pivot means formed on the underside of separator plate at said one side thereof to coact with said fixed pivot members, said separator plate being beveled on its underside to form second pivot means thereon extending longitudinally of said plate over said foot portion, and spring means interposed between said frame and the upper surface of said separator plate and biasing said plate toward and against said fixed pivot members and said foot portion, whereby one end of the strapping may be anchored between said foot portion and said second pivot means on the underside of said separator plate by the force exerted by said tensioning wheel toward said foot portion and on said plate and the other end of the strapping may be drawn over the upper surface of said separator plate by said tensioning wheel during the tensioning operation, and whereby pressure of the tensioning wheel on said other end of the strapping will cause rocking of said separator plate to align the upper surface of said separator plate, said other end of the strapping, and said tensioning wheel.

17. A power tool for applying tension to strapping about a bundle comprising in combination, a main frame having a fixed gripper against which one end of the strapping may be anchored, a relatively wide rotatable tensioning wheel mounted on said main frame for swinging movement toward and away from said gripper, power means connected to drive said tensioning wheel in strap tensioning direction, a movable separator plate overlying said gripper and positioned below said tensioning wheel and relatively closely thereto for limited floating movement therebetween, fixed pivot means carried by said main frame underlying said separator plate at the inner side thereof and on which said plate may rock toward and away from said gripper, second pivot means formed on the underside of said separator plate and extending longitudinally thereof over said gripper, and spring means interposed between said frame and the upper surface of said separator plate and biasing said plate toward and against said fixed pivot means and said gripper, the outer edge of said tensioning wheel and said separator plate being normally closer to each other than the other portions thereof when no strapping is therebetween, whereby one end of the strapping may be anchored between said gripper and said second pivot means on the underside of said separator plate by the force exerted by said tensioning wheel toward said gripper and on said plate and the other end of the strapping may be drawn over the upper surface of said separator plate by said tensioning wheel during the tensioning operation, and whereby pressure of the tensioning wheel on said other end of the strapping will cause rocking of said separator plate to lift the inner side of said plate away from said fixed pivot means and to align the upper surface of said plate, said other end of the strapping, and said tensioning wheel.

18. A tool for applying tension to strapping about a bundle comprising in combination, a main frame having a fixed gripper against which one end of the strapping may be anchored, a relatively wide rotatable tensioning wheel mounted on said main frame for swinging movement toward and away from said gripper, means connected to rotate said tensioning wheel in strap tensioning direction, a movable separator plate overlying said gripper and positioned below said tensioning wheel and relatively close thereto with the outer edges of said wheel and plate being closer together than other portions thereof and for limited floating movement therebetween, fixed pivot means carried by said main frame and underlying said separator plate adjacent the inner edge thereof and on which said separator plate may rock toward and away from said gripper, and the underside of said separator plate being beveled to define a pivot area extending longitudinally of the plate over said gripper, whereby one end of the strapping may be anchored between said gripper and said pivot area on the underside of said separator plate by the force exerted by said tensioning wheel toward said gripper and on said plate and the other end of the strapping may be drawn over the upper surface of said separator plate by said tensioning wheel during the tensioning operation, and whereby pressure of the tensioning wheel on said other end of the strapping will cause rocking of said separator plate to align the upper surface of said separator plate, said other end of the strapping, and said tensioning wheel.

19. A tool for applying tension to strapping about a bundle comprising in combination, a tool frame including means forming a fixed gripper against which one end of the strapping may be anchored, a relatively wide rotatable tensioning wheel mounted on said frame for swinging movement toward and away from said gripper, means connected to rotate said tensioning wheel in strap tensioning direction, a rockable separator plate mounted on said main frame, said separator plate overlying said gripper and being positioned below said tensioning wheel and relatively close thereto with one edge of said wheel and said plate being closer together than other portions thereof so that the second end of the strapping may be drawn over the upper surface of said plate and under said tensioning wheel by rotation of said tensioning wheel, and the underside of said separator plate being beveled to define a pivot area extending longitudinally of said plate over said gripper, whereby when pressure is exerted by said tensioning wheel on said second end of the strapping lying between said wheel and said separator plate said plate will rock on said pivot area to align the upper surface of said separator plate, said last second end of the strapping, and said tensioning wheel, and an anchoring force will be applied to the strapping lying between said separator plate and said gripper by said tensioning wheel through said separator plate.

*20. The combination in a strap tensioning tool for drawing a strap taut about an object to be bound, a frame adapted to rest on said object, a strap seat carried by said frame for supporting said strap, means including a rotary tensioning wheel for engaging said strap opposite said seat and effecting longitudinal movement thereof, said strap seat having a strap engaging portion which shifts relative to the strap seat under pressure exerted between the tensioning wheel and the strap seat to automatically provide uniform gripping pressure across the engaged portions of the strap even though the angular relationship between the tensioning wheel and the strap seat changes due to deflection of tool parts.*

*21. In a strap tensioning tool for drawing a loop of strap taut about an object to be bound and in which the strap is gripped between cooperating gripping members during the tensioning operation, the combination comprising, supporting means on the tool for the gripping members and means for maintaining the strap contacting surfaces of the gripping members parallel to one another in a direction transverse of the strap even though deflection occurs in said supporting means.*

*22. The combination in a strap tensioning tool for drawing strap taut about an object to be bound, a frame adapted to rest on said object, a strap seat carried by said frame for supporting said strap, means including a gripper for engaging said strap and pressing it against said seat, said strap seat having a strap engaging portion which shifts transversely of the longitudinal direction of the strap to be drawn taut under the pressure exerted by the gripper to automatically provide uniform gripper pressure across the engaged portions of the strap even though the angular relationship in a plane perpendicular to said strap direction between the gripper and the strap seat changes due to deflection of the tool parts.*

*23. The combination in a strap tensioning tool for drawing a strap taut about an object to be bound, a frame adapted to rest on said object, a strap seat carried by said frame for supporting said strap, means including a rotary tensioning wheel for engaging and applying pressure against said strap opposite said seat and effecting longitudinal movement thereof, said strap seat having a strap engaging portion pivotally attached thereto to provide angular movement of said portion with respect to said strap seat when subjected to pressure exerted by the tensioning wheel, said angular movement automatically maintaining a fixed relationship between the tensioning wheel and said strap engaging portion even though the angular relationship between the tensioning wheel and the strap seat changes due to deflection of the tool parts.*

*24. The combination in a strap tensioning tool for drawing strap taut about an object to be bound, a frame adapted to rest on said object, a strap seat carried by said frame for supporting said strap, means including a gripper for engaging and applying pressure against said strap opposite said seat, said strap seat having a strap engaging portion pivotally attached thereto to provide angular movement of said portion with respect to said strap seat in a plane perpendicular to the longitudinal direction of the strap positioned on said strap engaging portion when subjected to pressure exerted by the gripper, said angular movement automatically maintaining a fixed relationship between the gripper and said strap engaging portion even though the angular relationship in a plane perpendicular to said longitudinal direction of the strap between the tripper and the strap seat changes due to deflection of the tool parts.*

*25. The combination in a strap tensioning tool for drawing a strap taut about an object to be bound, including a frame adapted to rest upon the object, a strap seat carried by said frame for supporting the strap, means including a rotary tensioning wheel for engaging said strap opposite said seat for effecting longitudinal movement thereof, and a solid element having an upper strap engaging surface across which the strap extends for longitudinal movement supported on said strap seat, said element having a lower surface formed with a pivot portion extending longitudinally of the strapping to permit rocking of said element to automatically provide parallelism between the circumferential surface of said tensioning wheel and said upper surface of said element and uniform gripping engagement by said tensioning wheel across the engaged portions of the strap even though the angular relationship between said tensioning wheel and the strap seat changes due to deflection of the tool parts under the pressure exerted between the tensioning wheel and said element and said strap seat.*

*26. The combination in a strap tensioning tool for drawing a strap taut about an object to be bound, including a frame adapted to rest upon the object, a laterally extending foot carried by the frame and across which overlapping strap portions extend, means including a rotary tensioning wheel for engaging the upper strap portion for effecting longitudinal movement thereof, and a solid overlying said foot and interposed between the strapping portions and having an upper strap engaging surface across which the upper strap portion extends for longitudinal movement, said element having a lower surface between which and said foot of the tool the lower strap portion is anchored during the strap tensioning operation of the tool, said lower surface being formed with a pivot portion extending longitudinally of the strapping to permit rocking of said element to automatically provide parallelism between the circumferential surface of said tensioning wheel and said upper surface of said element and uniform gripping engagement by said tensioning wheel across the engaged portion of the strap even though the angular relationship between said tensioning wheel and said tool foot changes due to deflection of the tool parts under the*

*pressure exerted between said tensioning wheel and said element and said tool foot.*

References Cited by the Examiner

The following references, cited by the Examiner, are of record in the patented file of this patent or the original patent.

UNITED STATES PATENTS

| | | | |
|---|---|---|---|
| 1,996,202 | 4/1935 | Harvey. | |
| 2,182,004 | 12/1939 | Spencer | 140—123.6 |

| | | | |
|---|---|---|---|
| 2,368,969 | 2/1945 | Cleveland | 140—93.4 |
| 2,497,313 | 2/1950 | Leslie | 140—93.4 |
| 2,661,030 | 12/1953 | Crosby et al. | 140—93.4 |
| 2,936,156 | 5/1960 | Coupland | 254—51 |
| 3,021,876 | 2/1962 | Hall et al. | 140—93.4 |
| 3,032,075 | 5/1962 | Hall et al. | 140—93.4 |

WILLIAM FELDMAN, *Primary Examiner.*

O. M. SIMPSON, *Examiner.*